No. 12,024. Reissued Aug. 26, 1902.

G. DAHLBERG, J. CLICQUENNOI & E. UHLIN.

GAS AND STEAM CONVERTIBLE ENGINE.

(Application filed Aug. 7, 1901.)

3 Sheets—Sheet 1.

WITNESSES.

J. R. Keller

Alice T. Armstrong

INVENTORS.

Gustave Dahlberg
Jacob Clicquennoi and
Ernest Uhlin
by W. H. Doolittle & Son
attorneys.

THE NORRIS PETERS CO., PHOTO-LITHO., WASHINGTON, D. C.

No. 12,024.

Reissued Aug. 26, 1902.

G. DAHLBERG, J. CLICQUENNOI & E. UHLIN.

GAS AND STEAM CONVERTIBLE ENGINE.

(Application filed Aug. 7, 1901.)

3 Sheets—Sheet 2.

WITNESSES.

J. R. Keller

Olive T. Armstrong

INVENTORS.

Gustave Dahlberg
Jacob Clicquennoi and
Ernest Uhlin
by W. H. Doolittle & Son
attorneys.

THE NORRIS PETERS CO., PHOTO-LITHO., WASHINGTON, D. C.

No. 12,024. Reissued Aug. 26, 1902.
G. DAHLBERG, J. CLICQUENNOI & E. UHLIN.
GAS AND STEAM CONVERTIBLE ENGINE.
(Application filed Aug. 7, 1901.)
3 Sheets—Sheet 3.
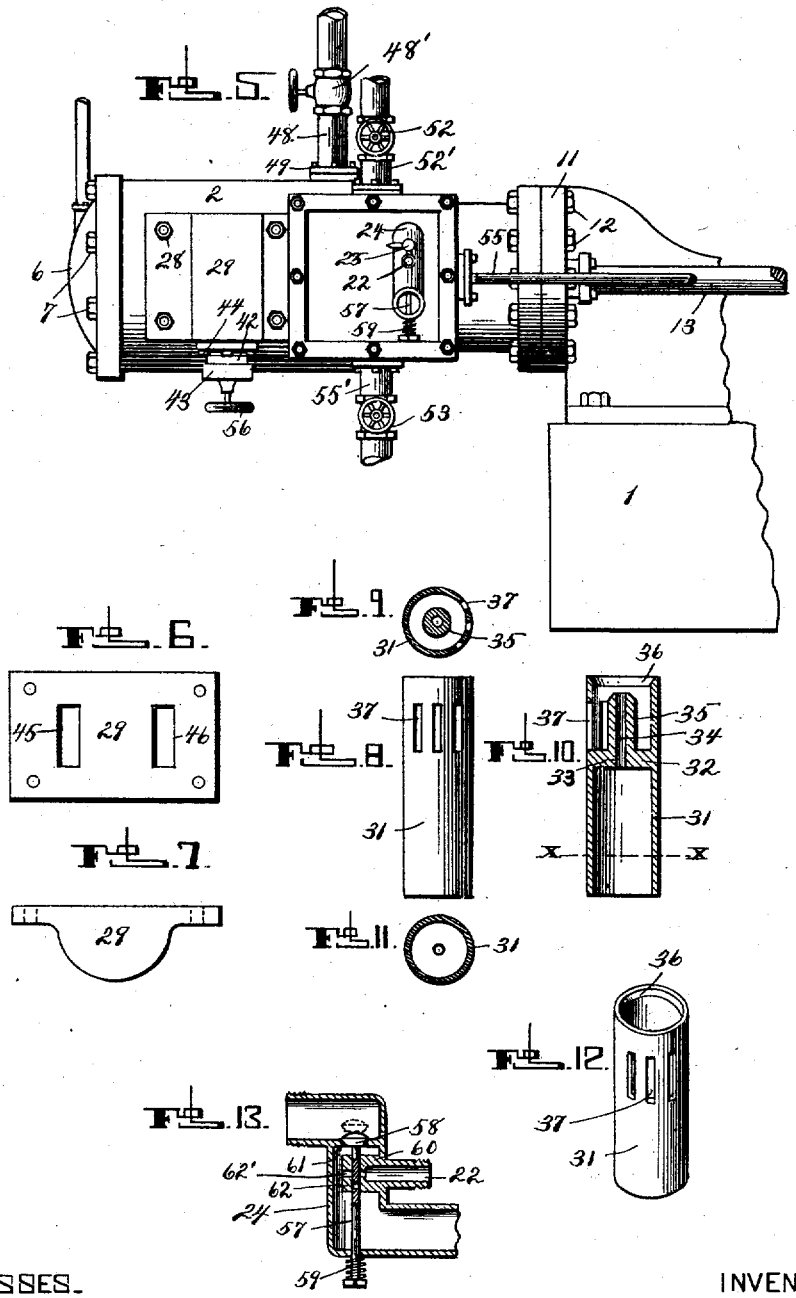
WITNESSES.
J. R. Keller
Olive T. Armstrong
INVENTORS.
Gustave Dahlberg
Jacob Clicquennoi and
Ernest Uhlin
by W. H. Boolidge, Jr.
Attorneys.
THE NORRIS PETERS CO., PHOTO-LITHO., WASHINGTON, D. C.

UNITED STATES PATENT OFFICE.

GUSTAVE DAHLBERG, OF McDONALD, JACOB CLICQUENNOI, OF TAYLORSTOWN, AND ERNEST UHLIN, OF McDONALD, PENNSYLVANIA, ASSIGNORS, BY DIRECT AND MESNE ASSIGNMENTS, TO D. C. & U. GAS ENGINE COMPANY, OF WASHINGTON COUNTY, PENNSYLVANIA.

GAS AND STEAM CONVERTIBLE ENGINE.

SPECIFICATION forming part of Reissued Letters Patent No. 12,024, dated August 26, 1902.

Original No. 633,339, dated September 19, 1899. Application for reissue filed August 7, 1901. Serial No. 71,278.

*To all whom it may concern:*

Be it known that we, GUSTAVE DAHLBERG, a resident of McDonald, JACOB CLICQUENNOI, a resident of Taylorstown, and ERNEST UHLIN, a resident of McDonald, in the county of Washington and State of Pennsylvania, citizens of the United States, have invented certain new and useful Improvements in Gas and Steam Convertible Engines, of which the following is a specification.

Our invention relates to a new and improved convertible engine in which either steam or gas may be employed for running the engine.

The present invention more particularly relates to that class of engines fully described and claimed in a reissue application filed by us on the 7th day of August, 1901; and it consists of a new and improved convertible engine and in the construction and combination of parts, all as fully hereinafter described and claimed.

Figure 1:
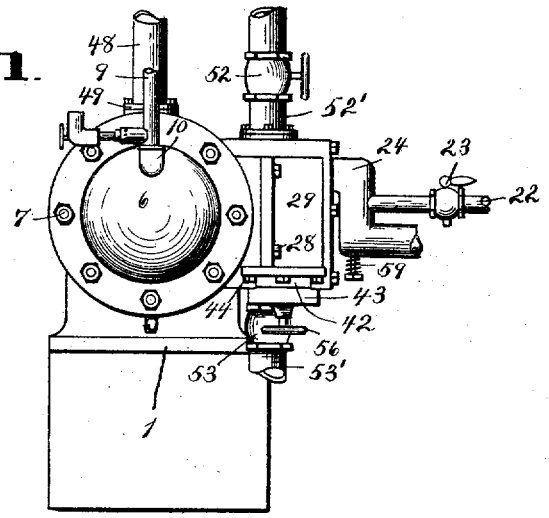
Figure 2:
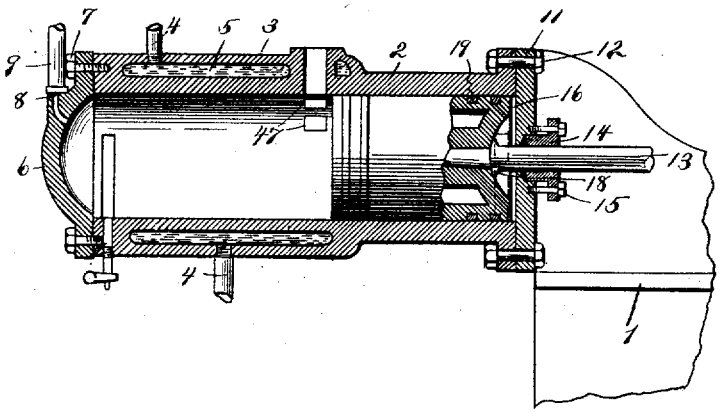
Figure 3:
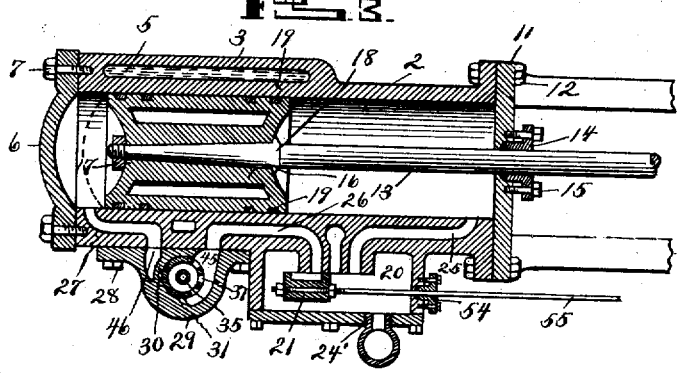
Figure 4:
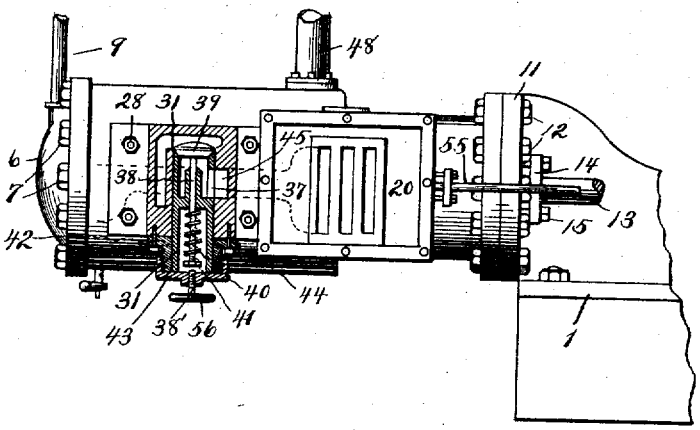

In the accompanying drawings, which illustrate an application of our invention, Figure 1 is an end view in elevation of an engine embodying our improvements; Fig. 2, a central vertical sectional view of the cylinder and an elevational view of part of the engine-frame; Fig. 3, a longitudinal sectional view of the cylinder and chest. Fig. 4 is a part side elevational view and a part sectional view; Fig. 5, a side elevational view; and Figs. 6, 7, 8, 9, 10, 11, 12, and 13, detail views showing various parts of the engine.

Referring to the drawings, the bed of the engine rests on a suitable support 1, and the cylinder 2 is preferably secured to a part of the engine-frame in the usual manner. A water-jacket 3, having openings to which pipe connections 4 are attached, partly surrounds the cylinder.

5 represents the water in the jacket. The combustion end of the cylinder is closed by a hemispherical head 6, secured to the cylinder by screw-bolts 7, and is provided with a port or passage 8 in communication with an igniter 9, the latter being attached to the head at some suitable point, as 10. The other end of the cylinder is closed by a head 11, which is preferably part of the frame of the engine, as illustrated. The cylinder is attached to head 11 by means of bolts 12. The head 11 is provided with an ordinary gland or stuffing-box 14, through which a piston-rod 13 passes, this stuffing-box being secured to the head by bolts 15. The piston-rod 13 is connected to a cross-head (not shown) in the usual and well-known manner. The piston 16, as shown, is secured to its rod by means of a nut 17 and a lug 18 and is provided with packing-rings 19. The piston-head may be of any suitable form. In practice, however, we prefer that the head should be convex, as shown by dotted lines in Fig. 3, rather than concave at its end nearest the head 6, the purpose of this construction being to present less steam-space in that end of the cylinder.

Formed integral with the cylinder 2, as shown, or suitably attached thereto is a chest 20, having a slide-valve 21. This chest is utilized for the receiving-chamber for both steam and gas and is further employed as a compression-chamber for the explosive mixture when the latter is used for running the engine. A gas-supply pipe 22, having a cock 23, leads into a mixer 24, which is connected to the chest 20, as shown at 24' in Fig. 3. This mixer and its operation will be more fully hereinafter described. Fluid-passages 25, 26, and 27 connect the interior of the chest with the interior of the cylinder, the passage 25 being in communication with the cylinder near one end thereof and on one side of the piston and the passage 27 in communication with the other end of the cylinder and on the other side of the piston. Between the passages 26 and 27 and located within a casing 29 is a valve 39. As shown, this casing is attached to the cylinder by bolts 28, and its interior is provided with a support 30 for the valve-cylinder 31. Valve-cylinder 31 is divided by a plate 32, having a central opening 33, which registers with an opening 34, running through a guide 35. The valve-cylinder is also provided with a seat 36 for valve 39 and with several ports 37.

Surrounding the valve-stem 38 and held between the plate 32 and a nut 41 on the valve-stem is a spring 40. This spring is designed to exert a pressure in the direction of the nut 41 and to keep the valve 39 on its seat 36. When operating the engine with steam, valve 39 is kept raised from its seat to permit an uninterrupted passage of the steam from the chest through passages 26 and 27 to the cylinder. While any suitable means could be employed for this purpose, we have shown a screw-threaded stem 38′, moved into and out of contact through a cap 43 by hand-wheel 56. A collar 42 on the valve-cylinder 31 is secured to the valve-casing by bolts 44 and the cap 43 to said collar. Valve-casing 29 is provided with passages 45 and 46, respectively registering with passages 26 and 27.

The removal of the exploded gases from the cylinder is effected through the exhaust-ports 47, which are preferably placed in the position shown by Fig. 2. These ports open into the exhaust-pipe 48. Steam is admitted to the chest 20 by steam-inlet pipe 52′ and is exhausted through pipe 53′. A suitable stuffing-box or gland 54 in an end of the chest 20 is provided for the valve-stem 55 of valve 21.

The mixer 24 is provided with a valve 58, which controls the admission of the explosive mixture to the chest. Valve-stem 57 extends outside the mixer and has a spring 59 thereon, held between a nut and the outside of the mixer. The spring is adapted to exert a pressure in the direction of the nut to normally keep the valve 58 on its seat 61. A guide 60 for the stem 57 is provided with a port which registers with a port 62 in the valve-stem 57 when the valve is moved from its seat.

When operating the engine with steam, the valve-stem 55 of the slide-valve 21 is connected to the eccentric-rod of the engine in the usual manner, and in order to allow a free passage for the steam through the passages 26 and 27 from the chest 20 to the combustion end of the cylinder and back again into the chest the valve 39 is kept clear of its seat by the screw-stem 38′. Steam is admitted to the chest through steam-pipe 52′, and the action of the engine is similar to an ordinary slide-valve steam-engine. Assuming that the engine has been running by steam-power and it is desired to use an explosive mixture to run the engine; in this case the valve 39 is caused to resume its seat by moving the screw-stem 38′ out of contact with the valve-stem 38, thereby closing the communication between the passages 26 and 27. Valve-stem 55 is disconnected from the eccentric-rod, and the slide-valve 21 placed in such a position that there will be an uninterrupted passage for the explosive mixture from the chest to the front end of the cylinder through passage 25 and from the chest to the under side of the valve 39 by way of passage 26. Close valve 53 of the steam-exhaust pipe, open valve 48′ of the exhaust 48, place the piston at the limit of its forward stroke, and open valve 23 of pipe 22, which is in communication with the source of gas-supply. The parts being arranged as above set forth a movement of the piston toward the rear or combustion end of the cylinder creates a partial vacuum in the chest 20, and the atmospheric pressure on the lower side of valve 58 raises the valve from its seat 61 and allows air to enter the chest. This movement of the valve 58 causes the opening 62 in valve-stem 57 to register with the port 62′ in the mixer, thereby allowing gas to enter the chest with the air. This explosive mixture fills the chest and the front end of the cylinder. When the piston has completed its backward stroke and starts on its next forward stroke, the pressure of the explosive mixture within the chest 20 and the atmospheric pressure on the lower side of valve 58 will be equalized. This being the case, valve 58 is closed by spring 59 and the explosive mixture confined within the chest. As the piston continues on its forward stroke the confined charge of explosive mixture is compressed in the chest 20 and passage 26 until its pressure is sufficient to overcome the resistance of the spring 40, which holds the valve 39 against its seat 36, when the valve will be forced from its seat and the compressed explosive charge passed to the combustion end of the cylinder through passage 27. When the piston reaches the extreme limit of this forward stroke and is started on its next backward stroke, the resistance-spring 40 will close valve 39, thereby confining the compressed explosive charge within the combustion end of the cylinder. Continuing this backward stroke of the piston the explosive charge is forced into the rear end of the cylinder, where it is ignited, the resulting explosion causing the piston to make another forward stroke. It will be noted that during the last-described backward stroke of the piston a fresh explosive charge is drawn into the chest and front end of the cylinder. A forward movement of the piston caused by the explosion compresses the fresh charge within the chest and the passage 26. The pressure, however, of this mixture is not sufficient to raise valve 39 until the piston uncovers the exhaust-ports 47, which permits the exploded gases to escape to the atmosphere through the exhaust 48. The escape of the exploded gases reduces the pressure on the upper side of valve 39, and the fresh compressed explosive charge is then admitted to the combustion end of the cylinder. This charge will expel the gases due to the explsion that may still remain in the cylinder, thus leaving a pure mixture for the next explosion. As soon as the piston starts on its next backward stroke the exhaust-ports will be closed and the compressed explosive charge be confined within the combustion end of the cylinder and ignited, as before described. The engine now being running the steps described are repeated.

Having thus described our invention, what we claim is—

1. In a convertible engine, the combination, with a cylinder, of a piston therein, a chest in communication with the cylinder, passages for steam and for an explosive mixture leading into the chest, fluid-passages from the chest to the cylinder in communication with opposite ends of the cylinder, a valve-casing provided with a valve for controlling the admission of an explosive charge to the combustion end of the cylinder said valve adapted to be opened by the pressure of the compressed explosive charge within the chest, substantially as set forth.

2. In a convertible engine, the combination, with a cylinder having a piston therein, of a chest in communication with the cylinder and with a steam-supply passage and an explosive-mixture passage whereby both steam and an explosive mixture are admitted to the chest at will, a mixer connected with the chest provided with means for controlling the admission of the explosive mixture to the chest, fluid-passages from the chest to opposite ends of the cylinder, a valve arranged in the passage leading to the combustion end of the cylinder for controlling the admission of a compressed explosive charge from the chest to the cylinder and adapted to be opened by the pressure of the compressed explosive charge, substantially as set forth.

In testimony whereof we affix our signatures in the presence of two witnesses.

GUSTAVE DAHLBERG.
JACOB CLICQUENNOI.
ERNEST UHLIN.

Witnesses as to the signature of Gustave Dalhberg:

E. J. REED,
A. J. ANDERSON.

Witnesses as to the signatures of Jacob Clicquennoi and Ernest Uhlin:

CORNELIUS CURRAN,
CHAS. CURRAN.